(12) United States Patent
Iwakawa et al.

(10) Patent No.: US 10,026,363 B2
(45) Date of Patent: Jul. 17, 2018

(54) WINDOW DISPLAY DEVICE

(71) Applicants: Naoto Iwakawa, Kariya (JP); Akihito Kouketsu, Kariya (JP)

(72) Inventors: Naoto Iwakawa, Kariya (JP); Akihito Kouketsu, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 75 days.

(21) Appl. No.: 14/863,488

(22) Filed: Sep. 24, 2015

(65) Prior Publication Data

US 2016/0104437 A1  Apr. 14, 2016

(30) Foreign Application Priority Data

Oct. 9, 2014  (JP) ................. 2014-208023

(51) Int. Cl.
| | |
|---|---|
| *G09G 3/34* | (2006.01) |
| *B60J 3/04* | (2006.01) |
| *F21V 8/00* | (2006.01) |
| *G02B 27/01* | (2006.01) |
| *G06F 3/01* | (2006.01) |
| *G09G 3/36* | (2006.01) |

(52) U.S. Cl.
CPC .............. *G09G 3/3413* (2013.01); *B60J 3/04* (2013.01); *G02B 6/0011* (2013.01); *G02B 27/0101* (2013.01); *G06F 3/017* (2013.01); *G09G 3/36* (2013.01); *G02B 2027/0118* (2013.01); *G02B 2027/0196* (2013.01); *G09G 2320/0626* (2013.01); *G09G 2360/144* (2013.01)

(58) Field of Classification Search
CPC .................. G09G 3/3413; G09G 3/36; G09G 2320/0626; G09G 2360/144; G06F 3/017; G02B 6/0011; G02B 27/0101; G02B 2027/0118; G02B 2027/0196
See application file for complete search history.

(56) References Cited

U.S. PATENT DOCUMENTS

| | | | |
|---|---|---|---|
| 2009/0027759 A1* | 1/2009 | Albahri ..................... | B60J 3/04 359/277 |
| 2011/0081953 A1* | 4/2011 | Higuchi ................ | G06F 3/0481 455/566 |

(Continued)

FOREIGN PATENT DOCUMENTS

| | | |
|---|---|---|
| CN | 104512221 A | 4/2015 |
| DE | 10 2010 021 563 A1 | 1/2011 |

(Continued)

OTHER PUBLICATIONS

Extended European Search Report for Application No. 15185545.9, dated Apr. 13, 2016 (8 pgs.).

(Continued)

*Primary Examiner* — Sahlu Okebato
(74) *Attorney, Agent, or Firm* — Patterson Thuente Pedersen, P.A.

(57) ABSTRACT

A window display device includes a display screen provided in a transparent rear window glass pane of a vehicle, an operating device adapted to detect an action for operating the display screen, and a control device, which displays a shade on the display screen. The shade is movable to selectively open and close the display screen based on an action performed on the operating device.

7 Claims, 12 Drawing Sheets

(56) References Cited

U.S. PATENT DOCUMENTS

| | | | |
|---|---|---|---|
| 2011/0115990 A1* | 5/2011 | Bhaktiar | B60R 11/0235 |
| | | | 348/794 |
| 2013/0066526 A1* | 3/2013 | Mondragon | G09G 5/00 |
| | | | 701/48 |
| 2014/0236358 A1 | 8/2014 | Sasaki et al. | |
| 2014/0359468 A1 | 12/2014 | Sasaki et al. | |
| 2015/0074584 A1 | 3/2015 | Sasaki et al. | |
| 2015/0074605 A1 | 3/2015 | Sasaki et al. | |
| 2015/0097389 A1* | 4/2015 | Dryselius | B60J 3/04 |
| | | | 296/96.19 |
| 2016/0231919 A1 | 8/2016 | Sasaki et al. | |
| 2016/0231920 A1 | 8/2016 | Sasaki et al. | |

FOREIGN PATENT DOCUMENTS

| | | |
|---|---|---|
| EP | 2 764 998 A1 | 8/2014 |
| EP | 2 857 239 A1 | 4/2015 |
| FR | 2970679 A1 | 7/2012 |
| JP | 2004325907 A | 11/2004 |
| JP | 2009-90832 A | 4/2009 |
| JP | 2009241807 | 10/2009 |
| WO | WO 2014084064 A1 | 6/2014 |
| WO | WO 2014129138 A1 | 8/2014 |

OTHER PUBLICATIONS

Chinese Office Action for Application No. 201510603556.4 dated Apr. 27, 2017 and English Language Translation, 10 pgs (Chinese Office Action—5 pgs.; Translation of Chinese Office Action—5 pgs).

Japanese Office Action for Application No. 2014-208023, dated Sep. 29, 2017, (Japanese Office Action—2 pgs.; Japanese Office Action Translation—3 pgs.) (5 pgs. total).

* cited by examiner

WINDOW DISPLAY DEVICE

RELATED APPLICATIONS

This present application claims priority to Japanese Patent Application No. 2014-208023, filed Sep. 24, 2015, said application being fully incorporated herein by reference in its entirety.

FIELD OF THE INVENTION

The present invention relates to a window display device that allows a shade to be freely drawn out onto and retracted from a display screen provided on a vehicle window.

BACKGROUND OF THE INVENTION

Japanese Laid-Open Patent Publication No. 2009-90832 discloses a shade device that includes shade panels, which are slidably provided on the inner side of a sunroof opening. The shade panels each have a light blocking pattern. The publication states that moving the shade panels as necessary provides aesthetic visual effects and changes light transmittance.

The shade device of Japanese Laid-Open Patent Publication No. 2009-90832 requires not only shade panels, but also rails for guiding the shade panels. This not only increases the number of components, but also requires spaces for installing the shade panels and the rails, which reduces the space of the passenger compartment. Further, a structure in which shade panels are moved at positions corresponding to a sunroof as in the above publication cannot cover the entire opening of the sunroof unless shade panels having sizes greater than or equal to the size of the sunroof are used. Also, shade panels that are not cumbersome may fail to properly block light.

SUMMARY OF THE INVENTION

Accordingly, it is an objective of the present invention to provide a window display device that is capable of properly shading a vehicle window without increasing the number of components in a passenger compartment.

To achieve the foregoing objective and in accordance with one aspect of the present invention, a window display device is provided that includes a transparent display screen provided in a transparent window glass pane of a vehicle, an operating device adapted to detect an action for operating the display screen, a control device, which displays a shade on the display screen. The shade is movable to selectively open and close the display screen based on an action performed on the operating device.

The term "transparent" includes the state of being translucent.

In the device of the present application, the display screen is capable of providing a window glass pane with a shade. This eliminates the necessity for providing shade panels in the passenger compartment and thus reduces the number of components. Also, the spaces for installing shades are not necessary, which enlarges the space of the passenger compartment. Since the entire window can be shaded without any gaps, light is properly blocked.

DETAILED DESCRIPTION OF THE PREFERRED EMBODIMENTS

One embodiment of the present invention will now be described with reference to the drawings.

Figure 1:
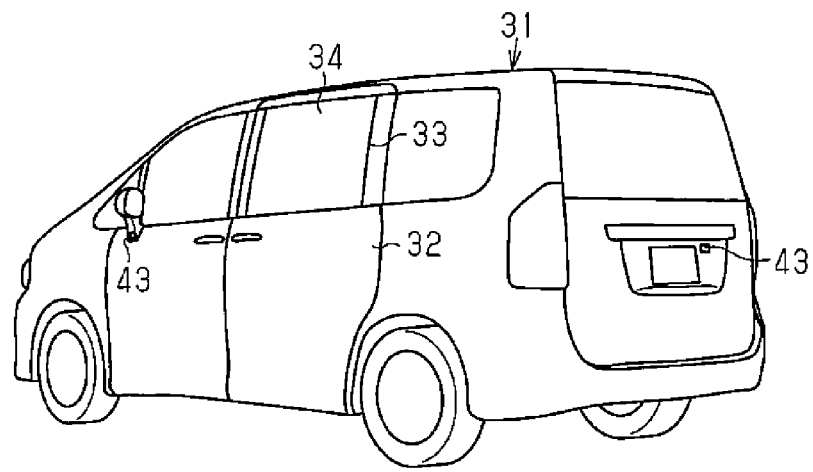
FIG. 1 is a perspective view of a vehicle.

As shown in FIG. 1, a vehicle 31 has a rear side door 32 with a rear side window 33. The rear side window 33 is equipped with a window glass pane, which is a rear side glass pane 34. The rear side glass pane 34 can be raised and lowered. In the following description, the side closer to the center of the passenger compartment will be referred to as an "inner side" of the vehicle 31, and the side closer to the outside of the passenger compartment will be referred to as an "outer side" of the vehicle 31.

Figure 2:
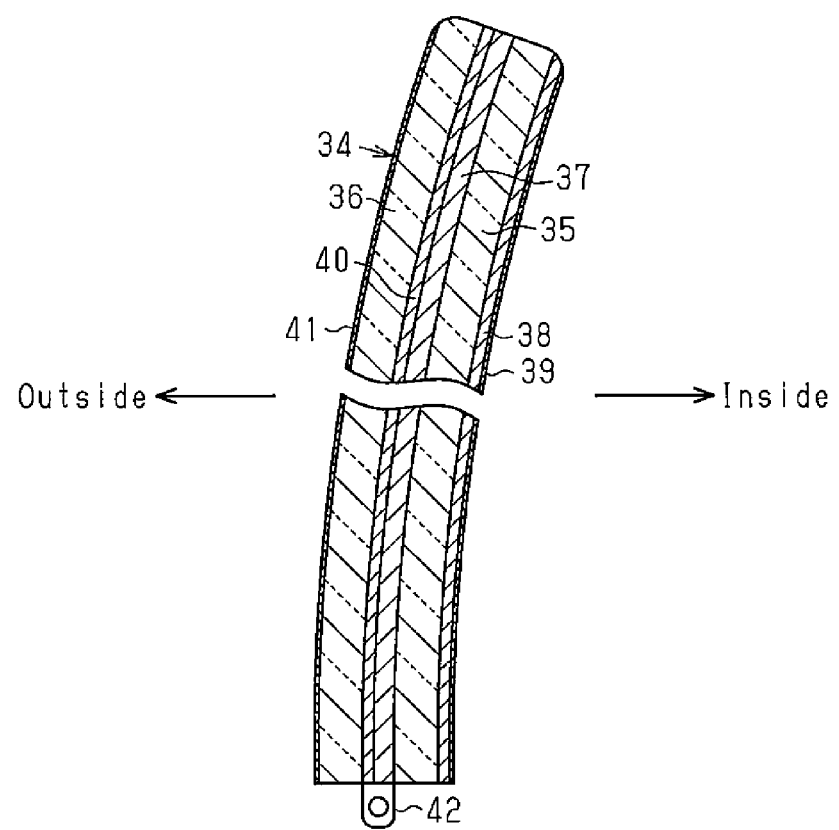
FIG. 2 is a cross-sectional view of a rear side glass pane.

As shown in FIG. 2, the rear side glass pane 34 includes a first glass sheet 35 on the inner side, a second glass sheet 36 on the outer side, and a color liquid crystal display sheet (hereinafter, simply referred to as a liquid crystal sheet) 37, which is arranged between the first and second glass sheets 35, 36. The liquid crystal sheet 37 displays various types of images and configures a display screen 61. A surface capacitive sheet sensor 38 (an operating device) is attached to the surface of the first glass sheet 35 on the inner side. When the sheet sensor 38 is contacted, for example, by a part of a human body, the capacitance of the contacted section changes, allowing the contact or changing in the contact position to be detected. A protective film 39 is attached to the surface of the sheet sensor 38 on the inner side.

A light guiding member 40 is attached to the surface of the second glass sheet 36 on the inner side, and a protective film 41 is attached to the surface of the second glass sheet 36 on the outer side. A light emitting body 42, which extends in the front-rear direction of the rear side glass pane 34, is located at the lower end of the rear side glass pane 34. Light from the light emitting body 42 is radiated as backlight onto the liquid crystal sheet 37 via the light guiding member 40. When the outside is bright, the liquid crystal sheet 37 makes displayed images visible using the outside light. When the outside is dark, the liquid crystal sheet 37 makes displayed images visible using the backlight. The light emitting body 42, which provides the backlight, is automatically turned on in response to an output from a light sensor (not shown) when the liquid crystal sheet 37 is operating to display images and the outside is dark.

A voltage applying electrode (not shown) for changing the orientations of the set of molecules in the liquid crystal sheet 37 and an electrode (not shown) for extracting changes in the capacitance of the sheet sensor 38 as changes in the voltage are provided on the periphery of the rear side glass pane 34.

Figure 3A:
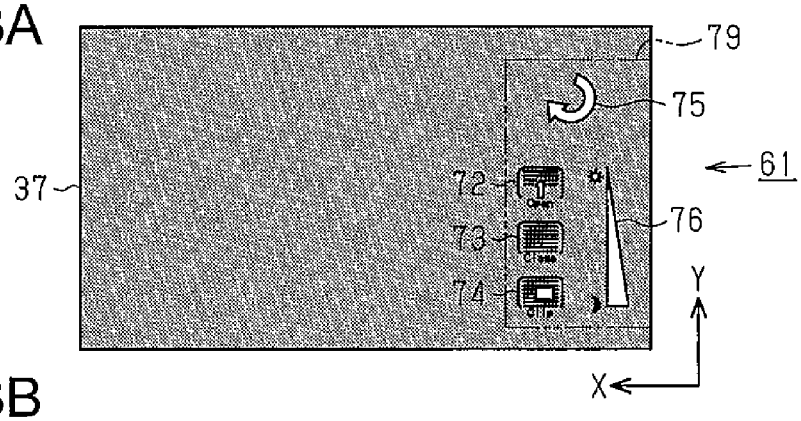
FIGS. 3A to 3C are front views showing how light transmittance is adjusted.
Figure 3B:
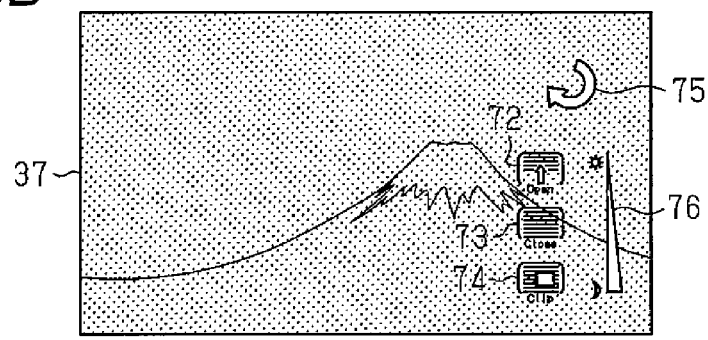
Figure 3C:
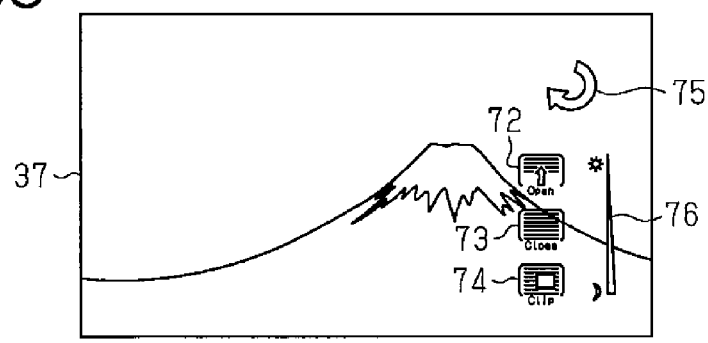
Figure 4:
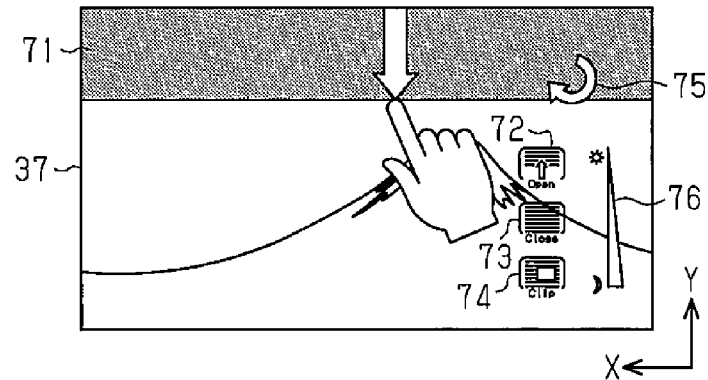
FIG. 4 is a front view showing a shade being pulled down.

The first glass sheet 35, the second glass sheet 36, the sheet sensor 38, the light guiding member 40, and the protective films 39, 41 are transparent. The liquid crystal sheet 37 is maintained to be transparent in an initial state, in which voltage is applied to the liquid crystal sheet 37. The liquid crystal sheet 37 is capable of displaying images on the screen 61. The entirety of the screen 61 can be changed among a transparent state, an opaque black state, and a translucent grey state. In other words, the liquid crystal sheet 37 can change its light transmittance. Thus, as shown in FIGS. 3A to 3C, the liquid crystal sheet 37, that is, the display screen 61 is set to one of the opaque state, the translucent state, and the transparent state. When the liquid crystal sheet 37 is either in the transparent state or the translucent state, the outside scenery can be seen through the rear side glass pane 34.

When the liquid crystal sheet 37 is in operation, a control interface portion 79 is set up in a side portion of the screen 61. In the control interface portion 79, a fully opening button 72, a fully closing button 73, a clip button 74, a back button 75, and a slide switch 76 are displayed. When the fully opening button 72 is turned on, a fully opening mode of the screen 61 is set up. When the fully closing button 73 is turned on, a fully closing mode of the screen 61 is set up. When the clip button 74 is turned on, a clipping mode is set up. Operations of these modes will be discussed below. In the clipping mode, which will be discussed below, a clip cursor 77 is displayed in a lower portion of the screen 61 of the liquid crystal sheet 37 as indicated by long dashed double-short dashed lines in FIG. 16A. The slide switch 76 is used for adjust the light transmittance of the liquid crystal sheet 37. The width of the slide switch 76 is changed in accordance with the light transmittance of the liquid crystal sheet 37. Specifically, the width is decreased as the light transmittance is increased. When the back button 75 is turned on, the set up mode is cancelled and the screen 61 is returned to the previous state. Switching of these buttons and the switch are executed based on changes in the capacitance at sections on the sheet sensor 38 corresponding to the buttons and the switch. Neither frame nor background is displayed to indicate the area of the control interface portion 79. The buttons and the switch, which configure the control interface portion, may have any forms as long as they are arranged at positions where they can be manipulated by a vehicle occupant and have appropriate configurations. For example, the buttons and the switch may be provided on a door trim, an armrest, or a remote controller. Further, the control interface portion may be configured by a multifunctional portable terminal, or a so-called smartphone.

Since the present embodiment is designed to detect changes in the capacitance when a finger contacts the sheet sensor 38, changes in the capacitance will hereafter be illustrated as actions of fingers. However, since the liquid crystal sheet 37 can be operated by changes in the capacitance, actions of fingers are not necessarily required. For example, a stylus may be used.

As shown in FIG. 1, a camera 43 for taking images of the outside of the vehicle 31 is provided on each of the front end, the sides, and the rear end of the vehicle 31. The outside scenery captured by the cameras 43 is displayed on the screen 61.

Figure 6:
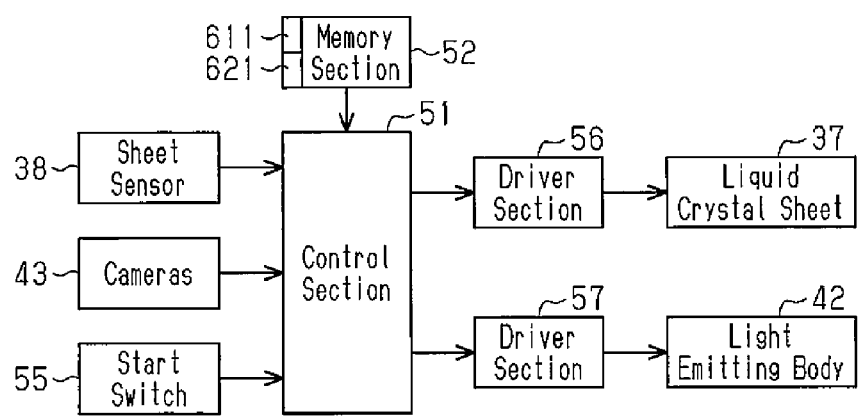
FIG. 6 is a block diagram showing a window display device.

FIG. 6 is a block diagram including a control section 51 (a control device), which controls operation of the window display device according to the present embodiment. A memory section 52 stores programs for operating the window display device and image data. The memory section 52 also stores temporary data. The control section 51 receives detection signals from the sheet sensor 38 and image data from the cameras 43. The control section 51 also receives switch signals from the start switch 55. The start switch 55 is provided, for example, on the console of the passenger compartment and is manipulated to turn on or off the window display device. The control section 51 operates the liquid crystal sheet 37 via a driver section 56 and operates the light emitting body 42 to emit light via a driver section 57.

As shown in FIG. 6, the memory section 52 includes a first memory area 611, which corresponds to the actual rectangular screen 61 formed by the liquid crystal sheet 37, and a second memory area 621, which corresponds to four virtual screens 62. The virtual screens 62 are each continuous with one of the four sides of the actual screen 61 but do not actually exist. Layers having various types of images are set up in each of the memory areas 611, 621 in accordance with the programs, and image data on the layers is displayed on the liquid crystal sheet 37 as images.

Operation of the present embodiment will now be described. Each of the flowcharts in FIG. 7 and subsequent drawings represents a program stored in the memory section 52 being executed through control by the control section 51.

When the start switch 55 shown in FIG. 6 is not turned on, the liquid crystal sheet 37 is not operated to display images and remains black. When the start switch 55 is turned on, the following modes are executed.

Initial Screen Setting Mode

When the start switch 55 is turned on, a transparent initial screen is shown on the liquid crystal sheet 37, and the rear side glass pane 34 is maintained in a transparent state shown in FIG. 3C. Therefore, the rear side glass pane 34 functions in a similar manner as a normal rear side glass pane, which does not have the liquid crystal sheet 37 or the light guiding member 40.

Figure 7:
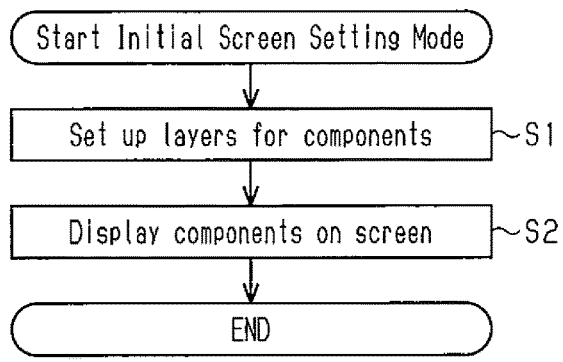
FIG. 7 is a flowchart showing a procedure of an initial screen setting mode of the display device.

At step S1 of the initial screen setting mode shown in FIG. 7, a layer for forming the control interface portion 79, which includes the buttons 72 to 75 and the slide switch 76, and a layer for the clip cursor 77 are set up in the first memory area 611. A layer for shades 71 is set up in the second memory area 621 of the memory section 52. Hereinafter, the "step" in the flowcharts will be simply expressed as an "S." In S2, data of the buttons 72 to 75 and the slide switch 76 of the control interface portion 79 is set up for each layer in the first memory area 611, and the buttons 72 to 75 and the slide switch 76 are displayed on the screen 61.

Figure 8:
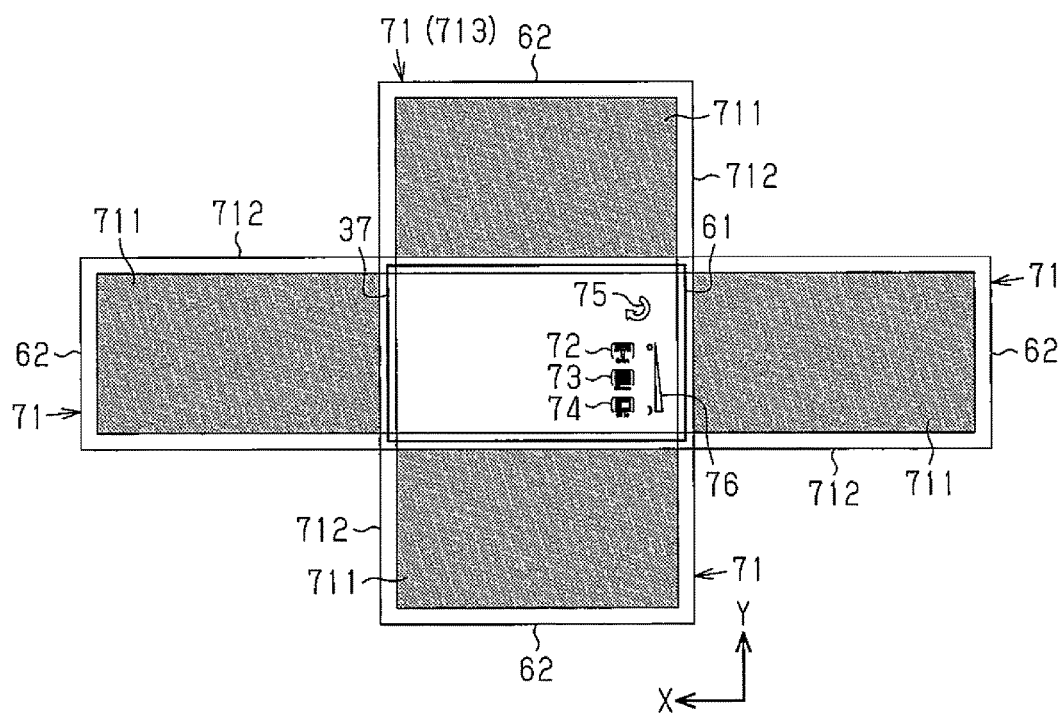
FIG. 8 is an explanatory screen diagram showing the initial screen setting mode of the display device.

Further, as shown in FIG. 8, the four shades 71 are arranged to correspond to the virtual screens 62 on the four sides of the screen 61. Each shade 71 has a shade section 711, the shading of which can be adjusted, and a colorless transparent section 712, which is located about the shade section 711. In the retracted state of the shades 71, the transparent sections 712 are respectively located on the four sides of the screen 61. In the initial screen setting mode, the clip cursor 77 is not displayed.

Shading Adjusting Mode

Adjustment of the shading, which indicates the transparency of the screen 61 shown in FIGS. 3A to 3C, is performed by adjusting the brightness of the red, green, and blue data (RGB data) of liquid crystal molecules.

Figure 9:
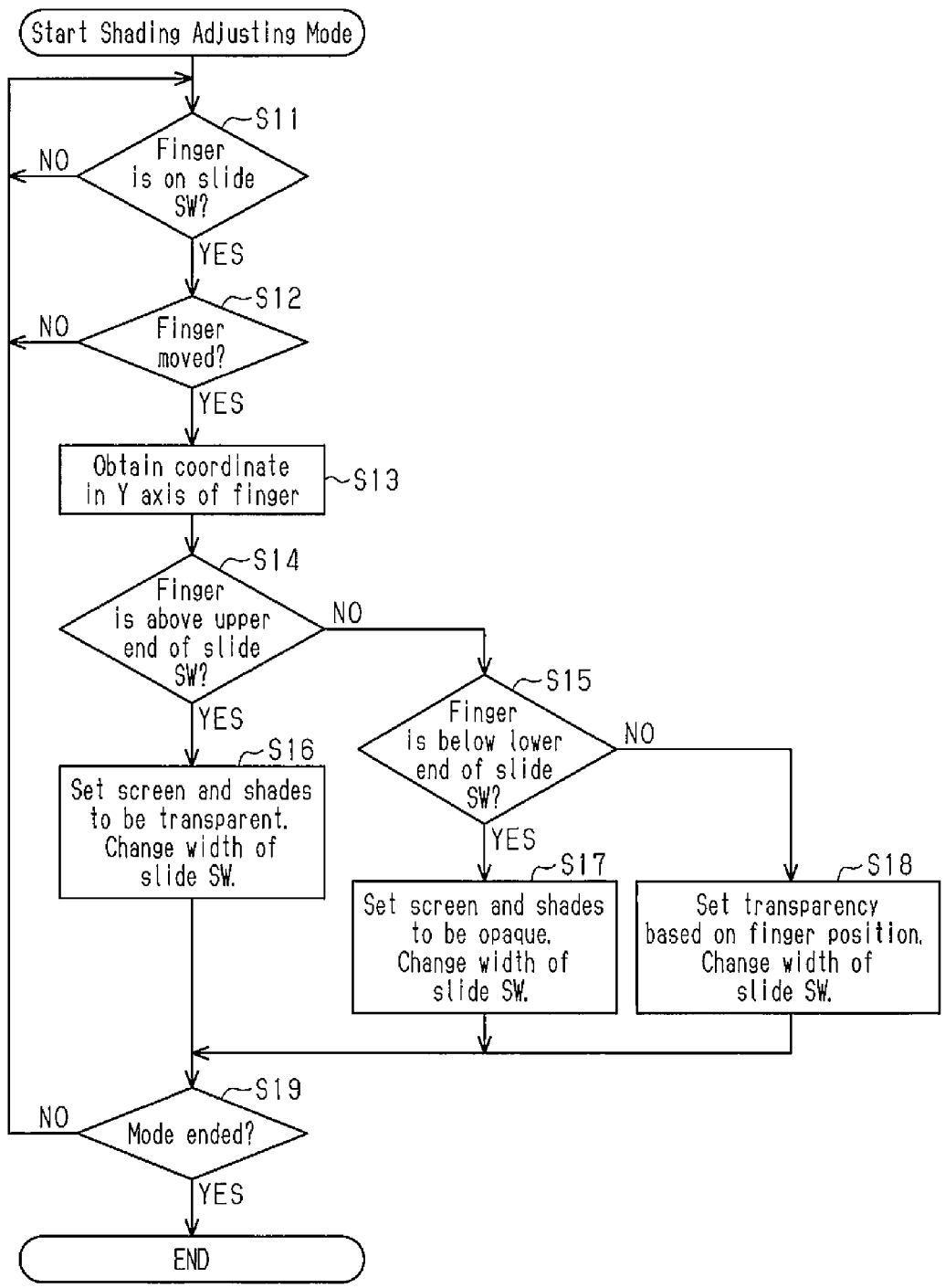
FIG. 9 is a flowchart showing a procedure for adjusting the shading of a shade.
Figure 11A:
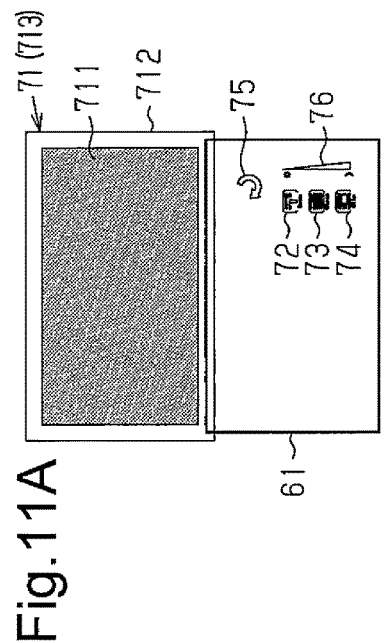
FIGS. 11A to 11C are explanatory screen diagrams showing the shade opening/closing mode.
Figure 11B:
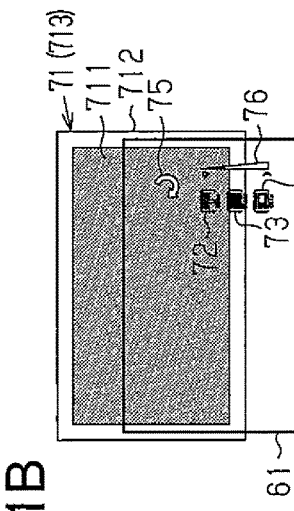
Figure 11C:
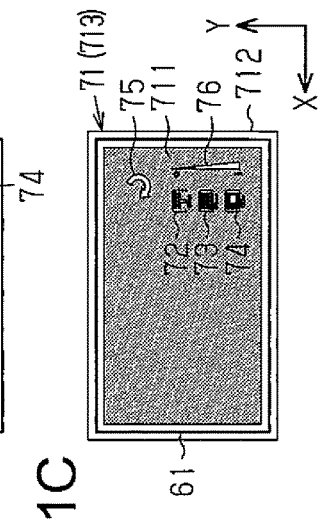

Specifically, when it is determined in S11 in FIG. 9 that a finger of a user is placed on the slide switch 76 (slide SW in FIG. 9), it is determined whether the position of the finger has moved along the slide switch 76 at S12. In other words, it is determined whether the user intends to adjust the shading. Then, at S13, the coordinate in the Y axis (the vertical axis) of the position of the finger after being moved is obtained and stored in the memory section 52.

Subsequently, at S14 and S15, the position on the Y axis of the finger after being moved is identified. If the position of the finger is above the upper end of the slide switch 76, the screen 61 and all the shades 71 are set to be transparent as shown in FIG. 3C at S16. If the position of the finger is below the lower end of the slide switch 76, the screen 61 and all the shades 71 are set to be opaque black as shown in FIG. 3A at S17. If the finger is on the slide switch 76, the screen 61 and all the shades 71 are set to have a transparency of translucent grey as shown in FIG. 3B in accordance with the vertical position on the slide switch 76 at S18. In this manner, the transparency of the screen 61, that is, the transparency of the rear side glass pane 34 is adjusted. In accordance with the adjustment of the transparency, the width of the slide switch 76 is adjusted.

When manipulation of any other switch is detected at S19, the shading adjusting mode is terminated and the set up transparency is maintained.

Shade Opening/Closing Mode

The shades 71 shown in FIGS. 4 and 11A to 11C are opened and closed in the following manner.

Figure 10:
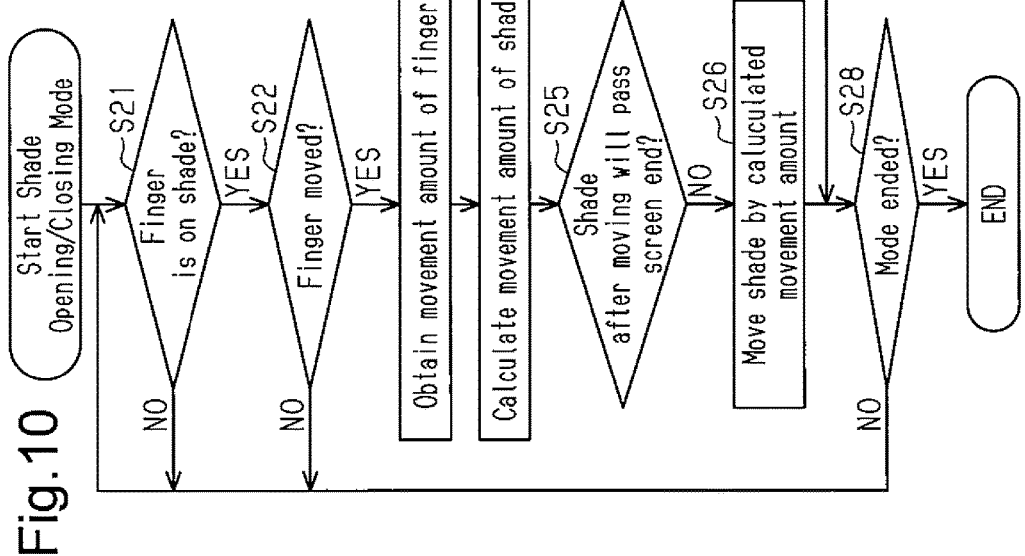
FIG. 10 is a flowchart showing a procedure of a shade opening/closing mode.
Figure 13:
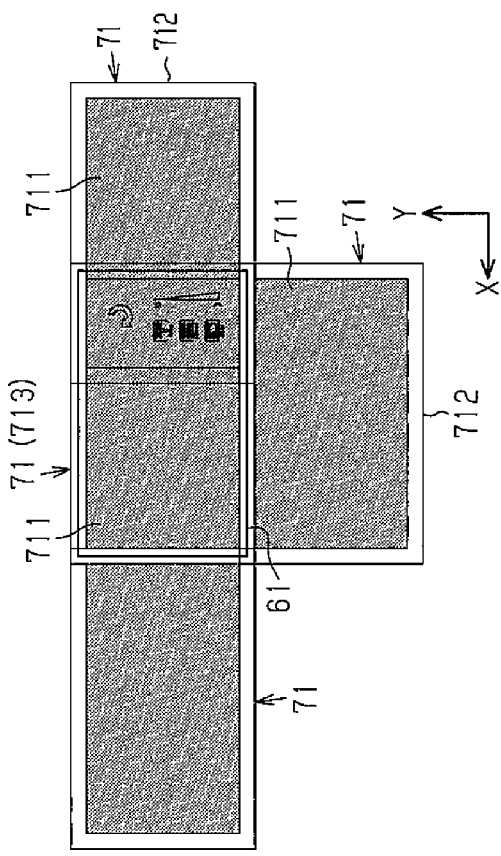
FIG. 13 is an explanatory screen diagram showing the shade fully closing mode.

First, the open state or the display state of any one of the four shades 71 is set as an initial state. In S21 of FIG. 10, it is determined whether a finger of the user is located on any of the transparent sections 712 or the shade sections 711 of any of the shades 71 at four positions. When one of the four the shades 71 is selected by the user, it is determined at S22 whether the finger of the user has moved in the shade drawing out direction or the shade retracting direction from the indicated position on the selected shade 71. Then, at S23, the data of the amount of movement of the finger from the indicated position of the selected shade 71 is obtained and stored in the memory section 52.

Next, at S24, the amount of movement of the selected shade 71 is calculated in accordance with the amount of movement of the finger. Then, at S25, it is determined whether the coordinate of the end of the shade 71 on the side close to the screen 61 will pass the end of the screen 61 if the movement based on the calculation result at S24 is completed. The end of the shade 71 on the side close to the screen 61 corresponds to the end of the shade 71 that is close to the screen 61 when the shade 71 is retracted as shown in FIG. 8. If the coordinate of the end of the shade 71 after moving will not pass the end of the screen 61, the shade 71 is moved either in the drawing out direction or in the retracting direction by the calculated movement amount at S26. If the coordinate of the end of the shade 71 will pass the end of the screen 61, the coordinate of the end of the shade 71 is set to the coordinate corresponding to the end of the screen 61 at S27. Then, at S28, it is determined whether the shade opening/closing mode has been ended based on whether other buttons have been operated.

As has been described, the user selects one of the four shades 71 and performs a drawing out operation or a retracting operation on the selected shade 71, so that the shade 71, of which the transparency has been adjusted, is arranged at a desired position.

Shade Fully Closing Mode

When the fully closing button 73 is turned on, the screen 61 is covered with one of the four shades 71 (in the embodiment, a top shade 713 located adjacent to and above the upper end of the screen 61). The shade 71 is thus in a fully closed state.

Figure 12:
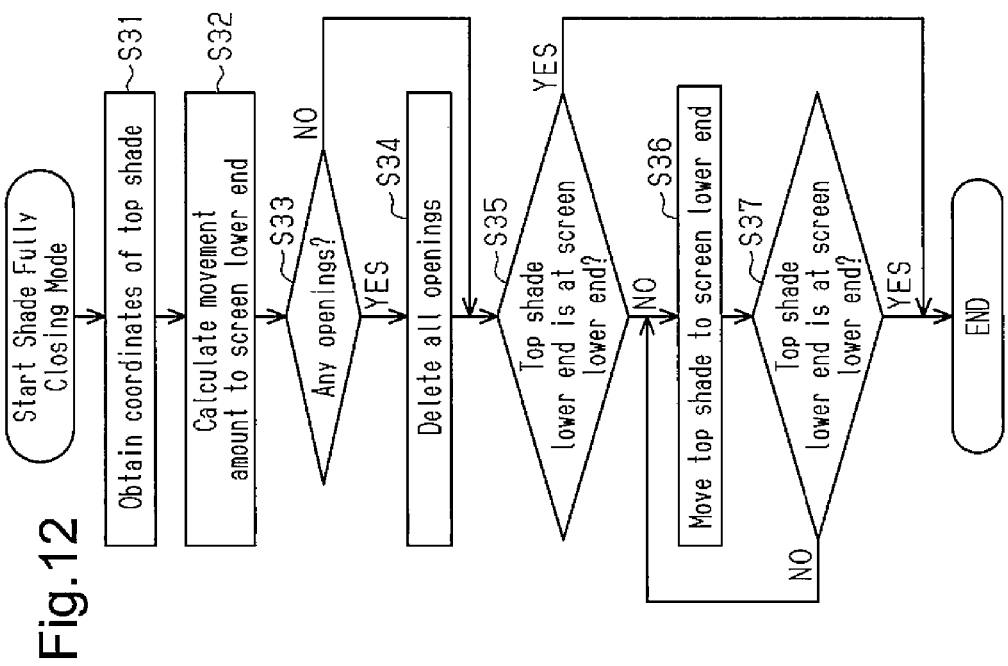
FIG. 12 is a flowchart showing a procedure of a shade fully closing mode.

Specifically, at S31 of FIG. 12, the current coordinate of the lower end of the top shade 713 is obtained. At S32, the amount of movement of the lower end of the top shade 713 to the lower end of the screen 61 is calculated. Then, it is determined at S33 whether any openings 78, each of which serves as a kind of a view port, exist. The details of the opening 78 will be discussed below. If one or more openings 78 exist, all the openings 78 are deleted at S34. Subsequently, it is determined at S35 whether the lower end of the top shade 713 is located at the position of the lower end of the screen 61. If the outcome is positive, the screen 61 has already been put in the fully closed state. The program is thus terminated. If the lower end of the top shade 713 is not located at the position of the lower end of the screen 61, the representation of the top shade 713, the transparency of which has been adjusted, is gradually moved until the lower end of the top shade 713 reaches the lower end of the screen 61 at S36 and S37, as if the user were manually operating a real shade. Accordingly, the screen 61 is put into the fully closed state.

Shade Fully Opening Mode

Figure 14:
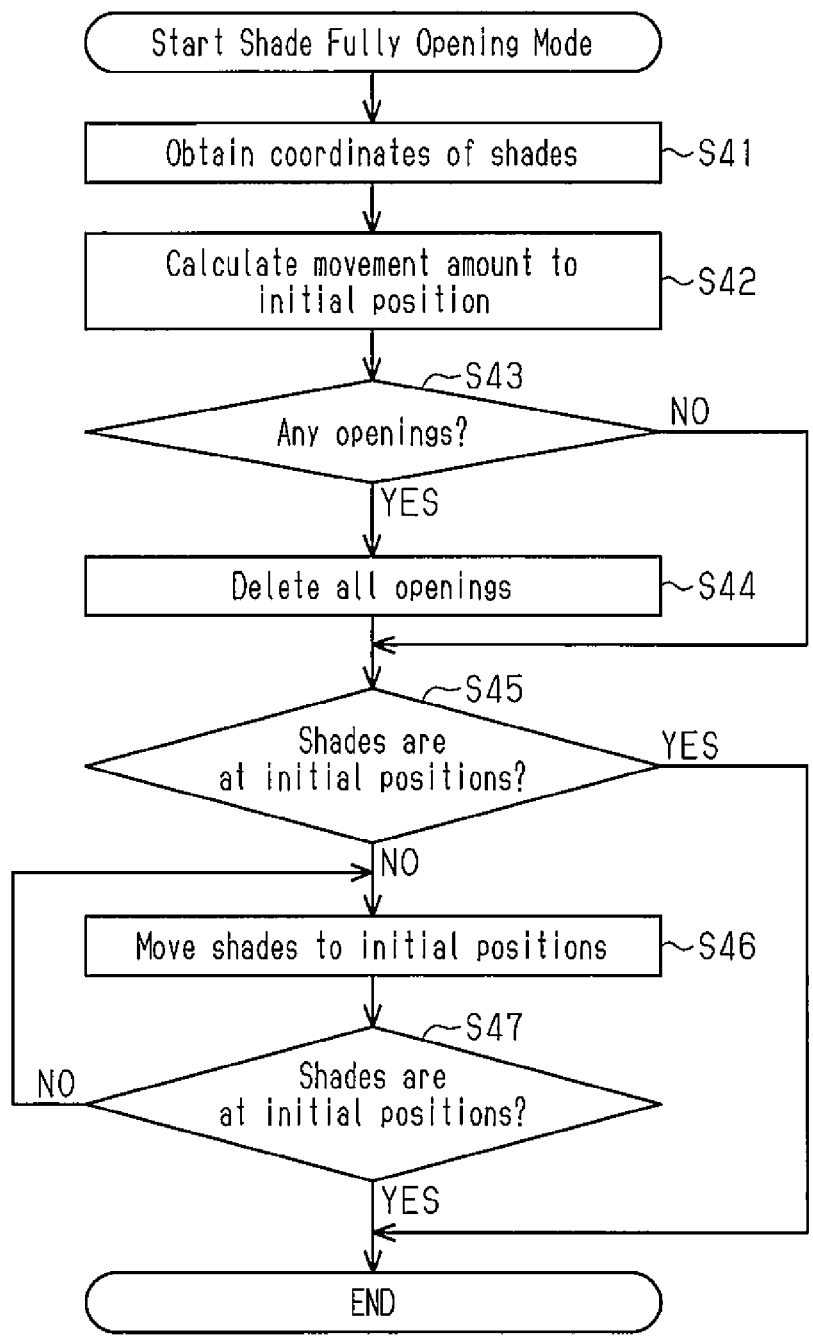
FIG. 14 is a flowchart showing a procedure of a shade fully opening mode.

When the fully opening button 72 is turned on, the coordinates of the current positions of the ends of the shades 71 on the side close to the screen 61 are obtained at S41 of FIG. 14, and the movement amount of each shade 71 to the initial position, that is, to the most retracted position, is calculated at S42. As described above, the end of the shade 71 on the side close to the screen 61 corresponds to the end of the shade 71 that is close to the screen 61 when the shade 71 is retracted as shown in FIG. 8. Next, it is determined at S43 whether any openings 78 exist. If one or more openings 78 exist, all the openings 78 are deleted at S44. At S45, it is determined whether the shades 71 are at the initial positions. If the shades 71 are at the initial positions and the screen 61 is in the open state, the program is terminated. If at least one of the shades 71 is at a position other than the initial position, that is, if at least one of the shades 71 is located on the screen 61, the representation of that shade 71 is gradually moved to the initial position at S46 and S47, as if the user were gradually opening a real shade, so that the screen 61 is put into the transparent fully open state.

Clipping Mode

Figure 15:
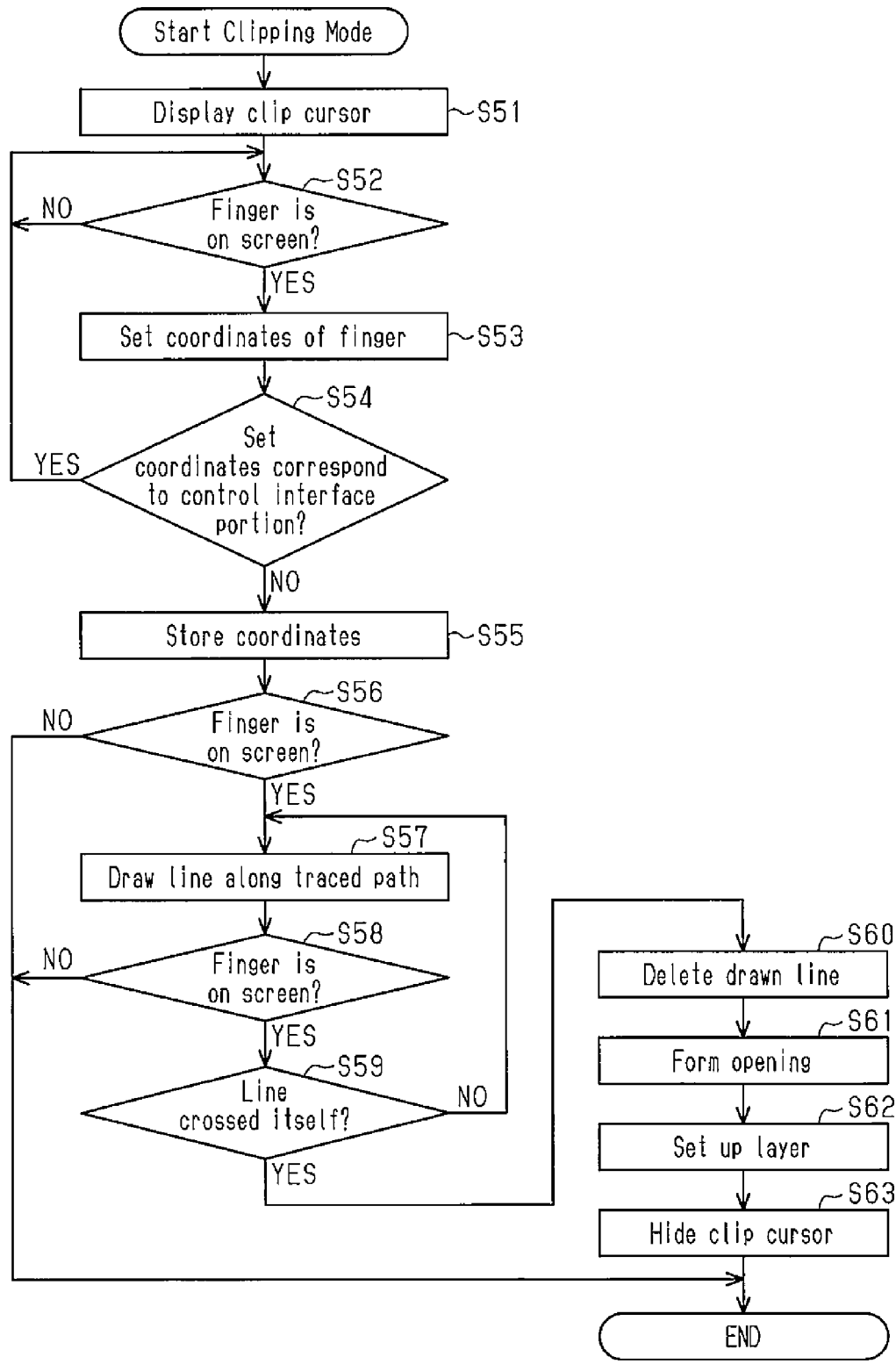
FIG. 15 is a flowchart showing a procedure of a clip function.

If the clip button 74 is turned on when the screen 61 is either in the opaque state or in the translucent state, the clipping mode shown in FIG. 15 is started.

Figure 16A:
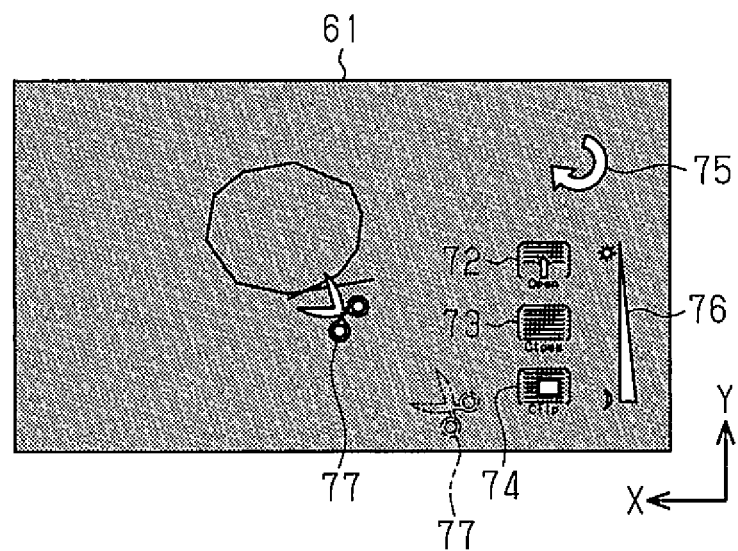
FIGS. 16A and 16B are explanatory screen diagrams showing the clip function.

Specifically, as represented by long dashed double-short dashed lines in FIG. 16A, a clip cursor 77, which indicates the position of cutting for forming an opening 78 in the shade 71, is displayed in a lower portion of the screen 61 at S51. Next, at S52, it is determined whether a finger is on the screen 61. If a finger is on the screen 61, coordinates on the X-axis and the Y-axis that indicate the position of the finger are set at S53. Then at S54, it is determined whether the set coordinates correspond to the position of the control interface portion 79. If the set coordinates correspond to the position of the control interface portion 79, the program returns to S52.

If the finger of the user is located a position other than the control interface portion 79, the data of the coordinates of the position of the finger is stored at S55, and the clip cursor 77 is moved to the position of the coordinates. Subsequently, if it is confirmed that the finger is continuously located on the screen 61 at S56, a line is drawn along the path traced by the finger at S57 as illustrated in FIG. 16A. At this time, the clip cursor 77 follows the movement of the tip of the line. Then, if it is confirmed that the finger exists on the screen 61 at S58, it is determined whether the drawn line has crossed itself at S59.

Figure 16B:
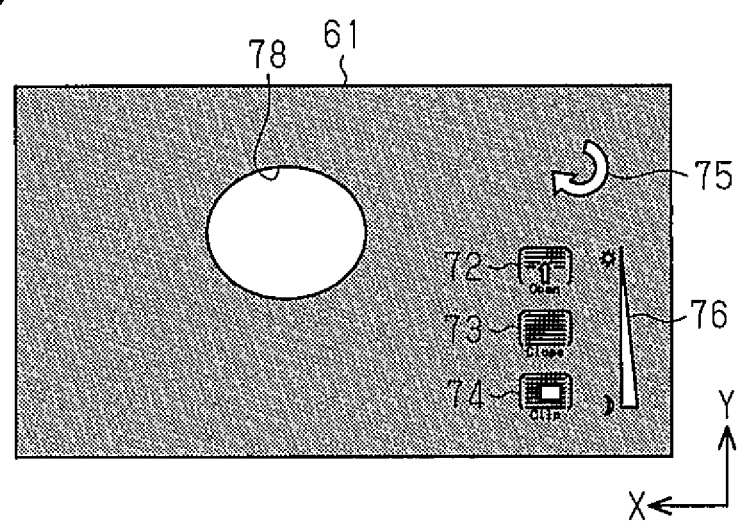

When the line has crossed itself, the entire drawn line is deleted at S60. Then, the data of the position and the shape of the opening 78 is calculated at S61. In this case, the ratio of the vertical dimension of the area defined by the drawn line to the lateral dimension is calculated. If the ratio is greater than or equal to a certain value, the shape of the area defined by the drawn line is determined to be a shape different from a circle, and the opening 78 is formed as an ellipse. In contrast, if the ratio is less than the certain value, the shape of the area defined by the drawn line is determined to be a shape close to a circle, and the opening 78 is formed as a circle. At S62, a layer for the opening 78 is set up, and as shown in FIG. 16B, the opening 78, which serves as a kind of a view port, is displayed at the position on the screen 61 that corresponds to the drawn line. The opening 78 is formed by making an area of the screen 61 that corresponds to the opening 78 transparent. Then, the clip cursor 77 is hidden at S63.

Figure 5A:
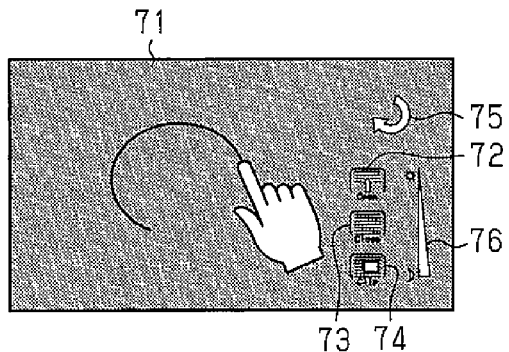
FIGS. 5A to 5D are front views showing how an opening is formed in a shade.
Figure 5B:
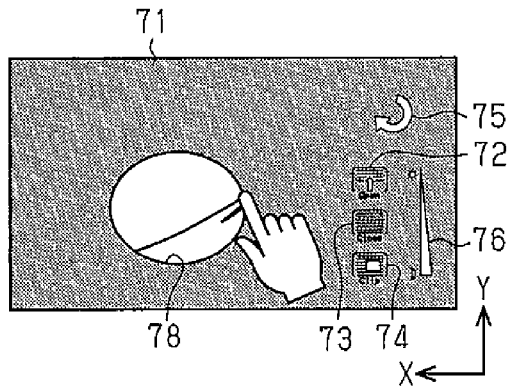
Figure 5C:
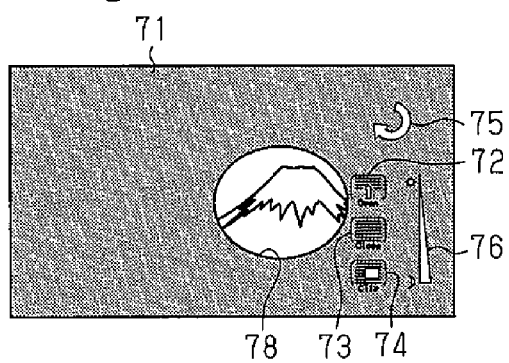

In this manner, the clipping mode is executed to form a circular or elliptic opening 78 as illustrated in FIGS. 5A to 5C.

Opening Moving Mode

Figure 18A:
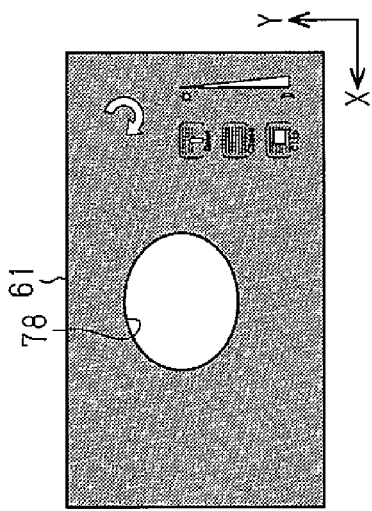
FIGS. 18A and 18B are explanatory screen diagrams showing the opening moving mode.
Figure 18B:
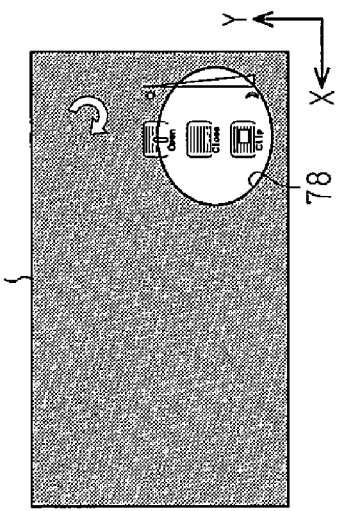
Figure 17:
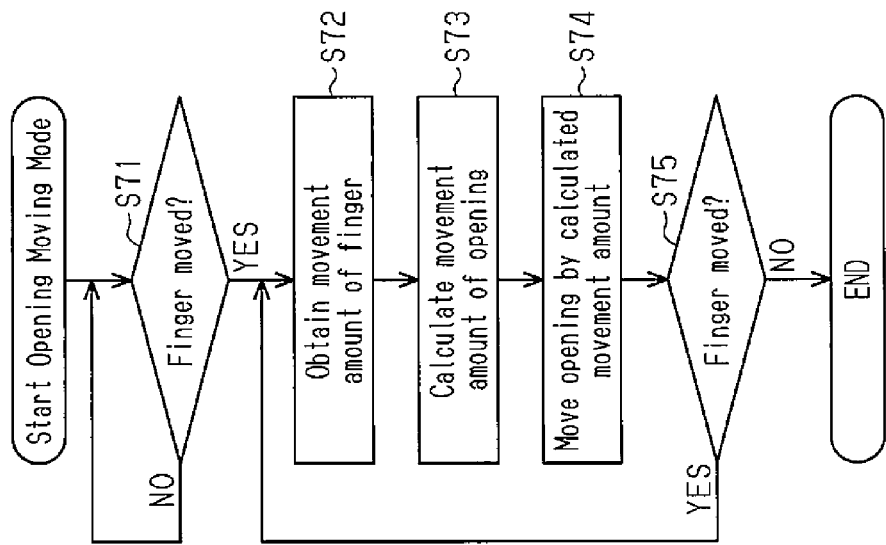
FIG. 17 is a flowchart showing a procedure of an opening moving mode.

In a state in which the opening 78 is displayed on the screen 61 as shown in FIG. 18A, if movement of the finger contacting the screen 61 is detected at S71 of FIG. 17, the movement amount of the finger along the X-axis and the Y-axis is obtained at S72. In accordance with the movement amount of the finger, the movement amount of the opening 78 is calculated at S73. Then, at S74, the opening 78 is moved as illustrated in FIG. 18B. The opening 78 keeps following the movement of the finger until it is determined that the movement of the finger is stopped at S75.

Opening Zooming Mode

Figure 20A:
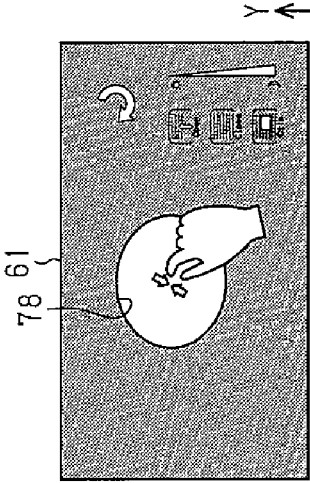
FIGS. 20A to 20C are explanatory screen diagrams showing the opening zooming mode.
Figure 20B:
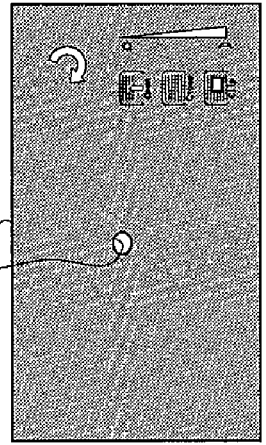
Figure 20C:
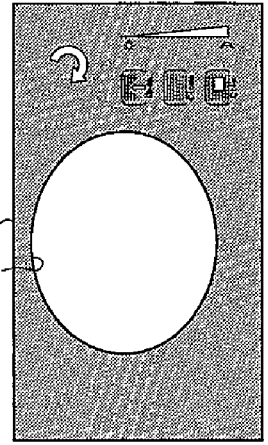
Figure 19:
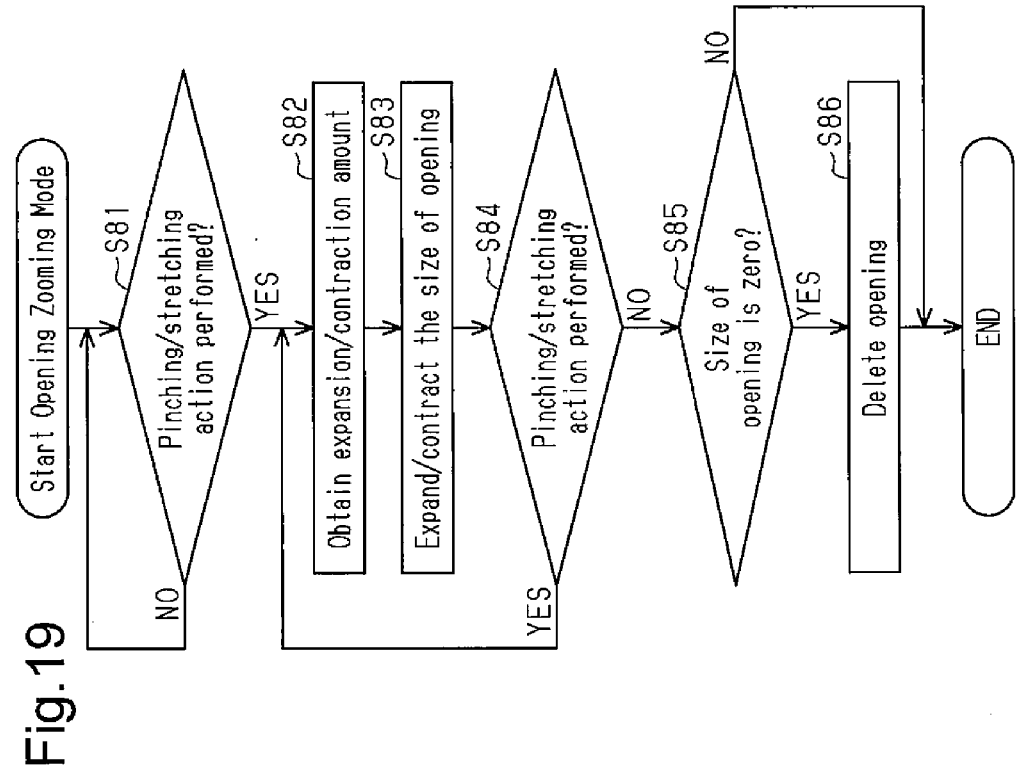
FIG. 19 is a flowchart showing an opening zooming mode.

In a state in which the opening 78 is displayed, if a pinching/stretching action due to movements of contacting positions of two or more fingers is detected on the screen 61 as shown in FIG. 20A at S81 of FIG. 19, the data of the amount of expansion/contraction due to the pinching/stretching action is obtained at S82. Based on the obtained amount of expansion/contraction, the size of the opening 78 is changed at S83 as shown in FIGS. 20B and 20C. Then, at S84, it is determined whether the pinching/stretching action is being continued. At S85, it is determined whether the specified size of the opening 78 is zero. If the specified size is zero, the opening 78 is deleted at S86, and the process is ended as the manipulation ends.

When the rear side glass pane 34 is being raised or lowered or when the rear side glass pane 34 is fully or partially open, operation of the display device of the present embodiment is preferably stopped. Also, the scenery captured by the cameras 43 can be displayed on the screen 61 through manipulation of an operating portion (not shown). Radiation of the light from the light emitting body 42 onto the liquid crystal sheet 37 via the light guiding member 40 allows the outside scenery to be seen at night.

The above described embodiment achieves the following advantages.

(1) Since the shade 71 displayed on the screen 61 blocks light, no shade panel needs to be provided in the passenger compartment. This reduces the number of components and eliminates the necessity for spaces for shade panels or rails. This enlarges the space of the passenger compartment.

(2) When the shade 71 is in the fully closed state, the window is entirely shaded without gaps. Thus, light is properly blocked.

(3) The closing position of the shade 71 and the transparency of the screen 61 can be freely adjusted by simple gestures of fingers. The passenger compartment therefore can be maintained comfortable in accordance with the season or the weather. Further, even in the shaded state, the outside can be seen through the window in the translucent state, while maintaining privacy in the passenger compartment.

(4) Since the opening 78 can be formed in the shaded portion, the outside can be seen in a peeping manner while maintaining the privacy in the passenger compartment. Further, since the size and the position of the opening 78 can be freely changed, the device adds to the fun to operate.

(5) Since the scenery captured by the cameras 43 can be displayed on the screen 61, the outside scenery can be seen at night.

The present invention is not limited to the above embodiment, but may be modified as follows.

In the above illustrated embodiment, the liquid crystal sheet 37 is provided in the rear side glass pane 34. However, the liquid crystal sheet 37 may be provided in other windows, such as a rear window or a quarter window. If the liquid crystal sheet 37 is provided in the rear window, a visual message can be presented for the following vehicle through display on the screen.

A scribble function may be provided. That is, when a finger is moved on the sheet sensor 38, the trace of the movement may be displayed with a line. In this case, the appearance of the scribbled image and characters can be improved by smoothing lines or painting areas surrounded by lines.

Figure 5D:
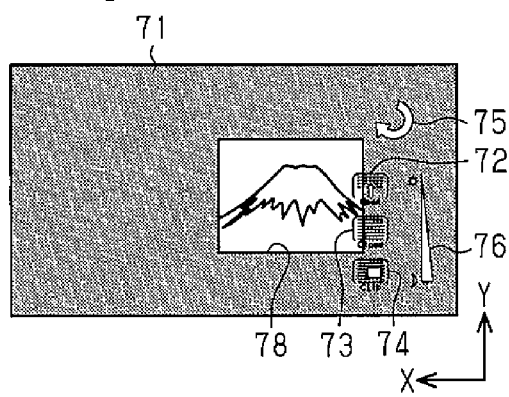

The opening 78 may have a shape other than a circle or an ellipse. For example, the opening 78 may have a rectangular shape as shown in FIG. 5D.

A television tuner, a DVD player, or a navigation system may be connected to the control device shown in FIG. 6, so that TV shows, movies, or a navigation display may be displayed on the screen 61.

In addition to functions to operate the shades 71 and the opening 78, operational displays for selection of music, tuning of television or radio, or the air conditioner may be displayed on the screen 61, so that these functions can be controlled through the screen 61.

As the display screen, a display medium other than a liquid crystal sheet may be used. For example, an organic electroluminescent (EL) sheet may be used.

As the sensor for detecting gestures of fingers, a sheet sensor other than a capacitive sensor may be used. For example, a resistive pressure sensitive sheet sensor or an electromagnetic sheet sensor, which is used with a stylus, may be used.

The operating device for operating the screen display may be provided at a different position, for example, in a remote-control device.

The invention claimed is:

1. A window display device comprising:
a transparent display screen provided in a transparent window glass pane of a vehicle;
an operating device adapted to detect an action for operating the display screen; and
a control device, which displays a shade on the display screen, wherein the shade is movable to selectively open and close the display screen based on an action performed on the operating device, wherein
the display screen includes four sides,
the shade is one of four shades that are provided to correspond to the four sides of the display screen,
each shade has a shade section and a transparent section located about the shade section,
when the display screen is fully opened, the transparent section of each shade is located on a corresponding one of the four sides of the display screen, and
when any one of the four shades is selected and operated by a user, the shade moves independently from the other shades.

2. The window display device according to claim 1, wherein the operating device is a sheet sensor provided on an inner side surface of the window glass pane.

3. The window display device according to claim 2, wherein the control device changes a transparency of the display screen based on a contact to the sheet sensor.

4. The window display device according to claim 2, wherein the control device displays an opening in the shades based on a detection of a contact to the sheet sensor.

5. The window display device according to claim 4, wherein the control device causes the opening to follow a movement of a contacting position on the sheet sensor.

6. The window display device according to claim 4, wherein the control device changes a size of the opening in response to a pinching/stretching action due to movements of a plurality of contacting positions on the sheet sensor.

7. The window display device according to claim 1, further comprising:
a light guiding member provided on an outer side of the display screen; and
a light emitting body, which radiates backlight onto the display screen via the light guiding member.

* * * * *